United States Patent
Varian

[11] Patent Number: 6,081,401
[45] Date of Patent: Jun. 27, 2000

[54] STEP GAP HEAD TRACKING SERVO

[75] Inventor: George R. Varian, Palo Alto, Calif.

[73] Assignee: Ampex Corporation, Redwood City, Calif.

[21] Appl. No.: 08/996,739

[22] Filed: Dec. 23, 1997

[51] Int. Cl.$^7$ .................................................... G11B 5/58
[52] U.S. Cl. ..................... 360/77.01; 360/77.06; 360/77.12; 360/119
[58] Field of Search ........................... 360/77.01, 77.06, 360/77.11, 77.12, 77.13, 119, 75

[56] References Cited

U.S. PATENT DOCUMENTS

| | | | |
|---|---|---|---|
| 2,832,839 | 4/1958 | Muffly | 360/119 X |
| 4,055,849 | 10/1977 | Hickok. | |
| 4,085,430 | 4/1978 | Gerkema et al.. | |
| 4,149,198 | 4/1979 | Behr et al. | 360/77.06 X |
| 4,164,764 | 8/1979 | Joannou | 360/77.01 |
| 4,502,082 | 2/1985 | Ragle et al. | 360/77.06 X |
| 4,633,344 | 12/1986 | Jeffers. | |
| 4,953,161 | 8/1990 | Toyama | 360/77.01 X |
| 5,060,092 | 10/1991 | van der Kop. | |
| 5,111,348 | 5/1992 | Baba. | |
| 5,257,148 | 10/1993 | Solhjell et al.. | |
| 5,388,014 | 2/1995 | Brug et al. | 360/77.06 X |
| 5,398,145 | 3/1995 | Jeffers. | |
| 5,898,534 | 4/1999 | Gray | 360/77.01 |

Primary Examiner—Glenton B. Burgess
Assistant Examiner—James L Habermehl
Attorney, Agent, or Firm—George B. Almeida; John G. Mesaros; Joel D. Talcott

[57] ABSTRACT

A read/write magnetic head includes a step offset formed in the gap of the head which accordingly generates recorded transitions in a recording medium which also contain a step offset in each successively recorded transition along the length of a track. On subsequent playback of the track by the same or similar step gap head, fine transverse mistracking of the head as it follows the track results in a corresponding echo signal being generated along with the main readout signal. The amplitude of the echo signal is indicative of the degree of fine mistracking while the location of the echo signal relative to the main signal is indicative of the direction of mistracking. Fine mistracking correction is provided by circuits which detect the amount and direction of mistracking and supply an error signal to a tracking servo to correct the mistracking.

22 Claims, 4 Drawing Sheets

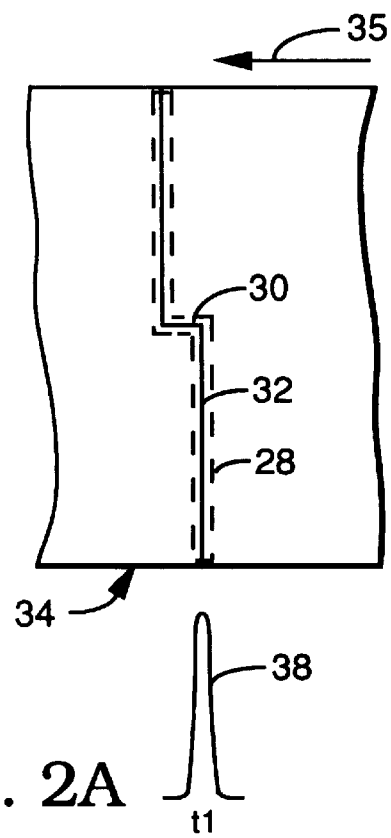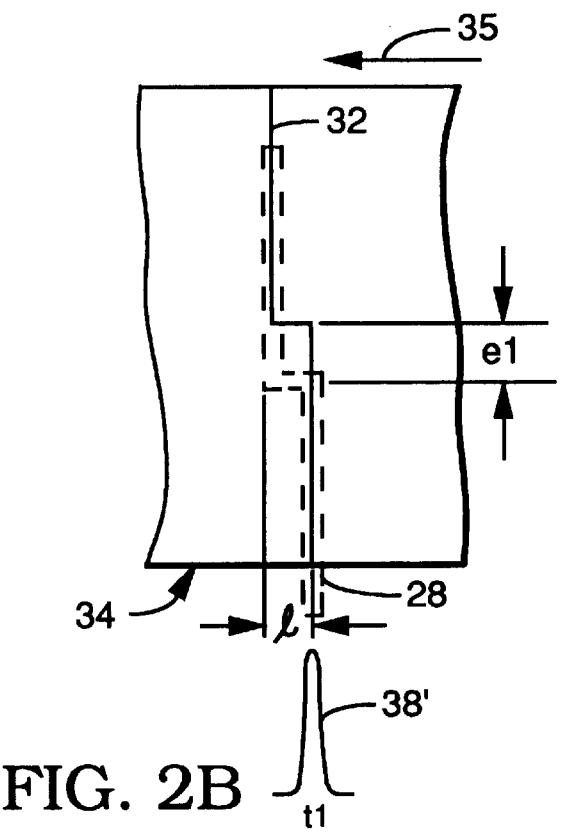
FIG. 2A  FIG. 2B
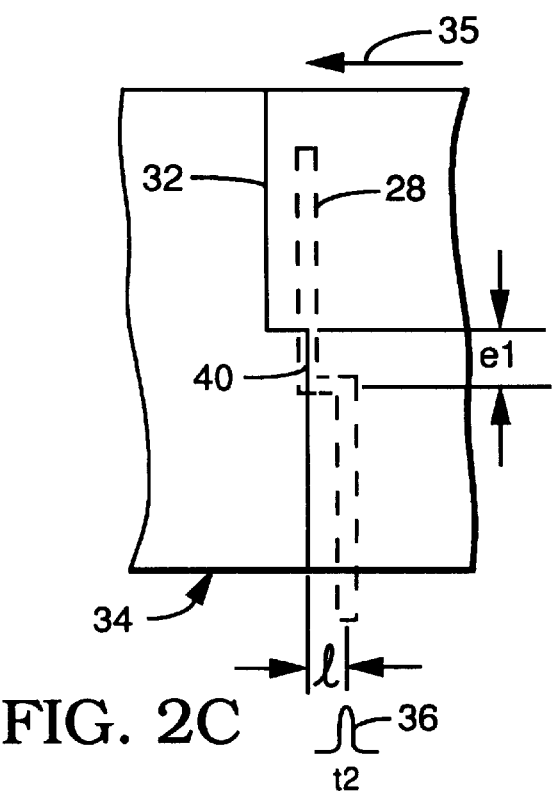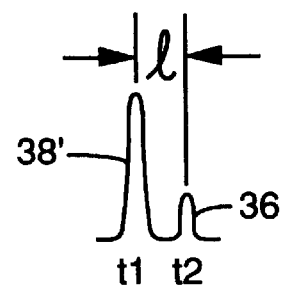
FIG. 2C  FIG. 2D

STEP GAP HEAD TRACKING SERVO

FIELD OF THE INVENTION

The present invention relates to servo control in high-density magnetic recording devices, and, more particularly, to control read heads in magnetic recording devices to ensure proper fine tracking.

BACKGROUND OF THE INVENTION

Many modern magnetic recording devices, such as disk drives, video tape recorders and tape data recorders, use multiple substantially parallel tracks on magnetic media. Data is encoded onto the magnetic media in the form of magnetic transitions induced in the media by magnetizing selected regions using electromagnetic write heads. Because of the nature of the media, these transitions remain on the media and induce a playback signal in electromagnetic read heads subsequently passed over the track in a playback mode.

Clearly, following the correct track is essential to correctly retrieve the desired data. However, there is great pressure to increase the densities of tracks of data on the magnetic media in order to increase the storage capacity of the media. This density increase leads to ever-narrower tracks. It follows, therefore, that tracking is complicated by such factors as mechanical vibration of the actuator, disk or spindle assembly, thermal track shifts and other mechanical sources of mistracking. These effects create track shifts that are largely independent of track-width, and so they present a far greater problem as tracks become narrower. Hence, the pressure to increase track density leads to increased problems in providing accurate tracking.

A number of approaches have been used in the prior art to ensure such correct tracking. One early method, used in disk drives, was to use a dedicated disk in a multi-disk pack which contained specialized servo coding to provide a clear indication of head location on the servo control disk. The dedicated disk was rigidly linked to the remaining disks in the pack, thereby ensuring precise knowledge of the position of the heads relative to the track. Unfortunately, this approach requires the loss of significant disk surface to the dedicated servo information, surface which could otherwise be used for data storage. In addition, this technique requires the added complexity of a dedicated servo disk head rigidly connected to the read/write head.

An approach currently used to ensure correct tracking in disk drives is to embed servo information onto the data tracks themselves. These "burst" servo approaches require that easily distinguished, often intense, servo bursts be placed onto specific angular positions around the track. In this manner, a servo control system can readily determine the exact location of the head on the track, without the need to decode the data signals themselves, since the bursts are both intense and distinctive. More sophisticated versions of this approach use multiple burst segments covering parts of multiple, adjacent tracks, staggered both longitudinally and laterally along the tracks to enable exact determination of the head location.

Again, this approach requires that a significant amount of media be dedicated to servo information, surface area which could, otherwise, be used for data storage, thereby increasing the data storage capacity of the disk. Further, it may require that the head read multiple tracks. While this may be unavoidable for initially locating the correct track during relocation of the head from one data track to another, it may undesirably complicate the servo process during intra-track processes.

Other approaches used to ensure correct tracking have focused on utilizing measured signal strength to ensure that the head is correctly centered on the track. For example, read heads have been used having dual head elements, each generating a signal. If such a head were tracking correctly, these two signals should be substantially identical. If the head were to drift in one direction, the signal from the head element which is drifting away from the track would decrease. This signal behavior is used to track the head's centering on the track. The two signals from the head elements are summed to yield the data signal and subtracted to yield an error signal. The polarity of the error signal indicates the direction of transverse drift, and the intensity of the error signal indicates the severity of drift.

While such an approach is helpful in ensuring centering of the head on the track, in practice this approach requires separate read and write heads, with a single-element write head. For example, problems may arise if playback by such a bifurcated head were attempted of a track recorded by a different bifurcated head since minuscule differences in alignment of the head elements of the two different heads could lead to mistracking in the read mode. In such a case, recording would have to be by a single element write head to ensure uniformity of the signal laterally across the track.

Hence, a practical implementation of such a system would require separate read and write heads. However, the use of such separate heads in a disk drive would undesirably increase the cost and complexity of the drive, and, hence, this method is of limited value in actual computer disk drives.

As a result of these problems, it would be desirable to provide a tracking servo system for disk drives, tape recorders, etc., utilizing a single read/write assembly, where tracking is based on the signal from an actual single track with a minimum of dedicated servo control space on the media. Such a system should have a high bandwidth and be of practical use in repeatedly accessing the same track at a desired location.

SUMMARY OF THE INVENTION

The present invention overcomes the problems of previous mention and comprises an apparatus and method for fine-tracking the location of an electromagnetic read/write head relative to a magnetic track in a magnetic medium such as a hard disk of a disk drive system or a magnetic tape of a digital tape recorder.

To this end, the invention provides a unique read/write head which includes a step offset at the middle of the head; that is, at generally the center of the associated track generated and read out by the head when the head is precisely on track. More particularly, the head gap is formed with a step offset, or transition, which lies generally parallel to the length of the track. Such a step offset may be made by forming a step on the surface of a substrate on which a thin film head is fabricated and then selectively depositing the thin film material on the stepped surface when forming the head poles.

A recording made in a magnetic medium accordingly will have a corresponding step in the center of each successively recorded transition along the length of the track. On subsequent playback of the track by the same or similar step gap head, transverse mistracking of the head as it follows the track results in a corresponding echo signal being generated along with the main signal. The echo signal either precedes or follows the main readout signal, depending upon the direction of mistracking, to allow correcting any mistracking. The amplitude of the echo signal is a measure of the degree of tracking error. In accordance with an embodiment of the invention, the undesirable echo signal is removed from the desired main readout signal by means of a transversal filter with adjustable taps preceding and following a main tap by a time period equal to the separation time between the echo and main readout signals. The tap weights are set using, for example, a least mean square (LMS) algorithm. Once the tap weights are set, the magnitude of the tap weights is a measure of the tracking error. Mistracking correction is provided by detecting the amount of tracking error and the direction of the mistracking and using the resulting correction signal to transversely move the head back to proper alignment with the track via tracking servo and head actuator means.

It is to be understood that the tracking method and apparatus of the invention primarily is directed to fine-tracking error correction, that is, provides fine error correction within head mistracking of, for example, less than one-third the track width. If the head is further off track, the echo signal amplitude approaches the amplitude of the main signal which makes it difficult to distinguish between the two signals. This, in turn, causes ambiguities in the signals supplied to and read from, for example, the transversal filter of previous mention. Initial coarse error correction is provided by other typical tracking systems, such as, for example, the conventional servo tracking systems of previous mention using once-per-track servo bursts.

BRIEF DESCRIPTION OF THE DRAWINGS

FIGS. 2A–2G are diagrams illustrating the relationship of a read head step gap to a track in the tape and the corresponding echo and main signals generated thereby when the head is properly aligned and when it is mistracking.

DESCRIPTION OF THE PREFERRED EMBODIMENTS

Figure 1:
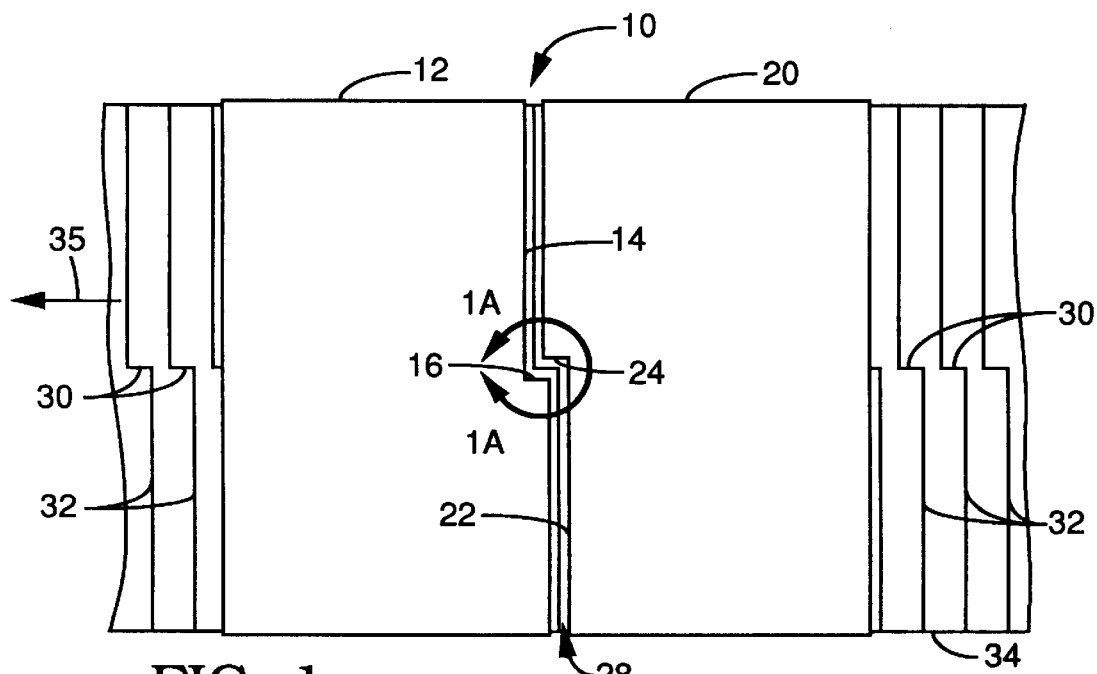
FIG. 1 is a diagram illustrating a step gap head configuration of the invention in scanning relation to a recorded track formed of step gap recorded transitions.
Figure 1A:
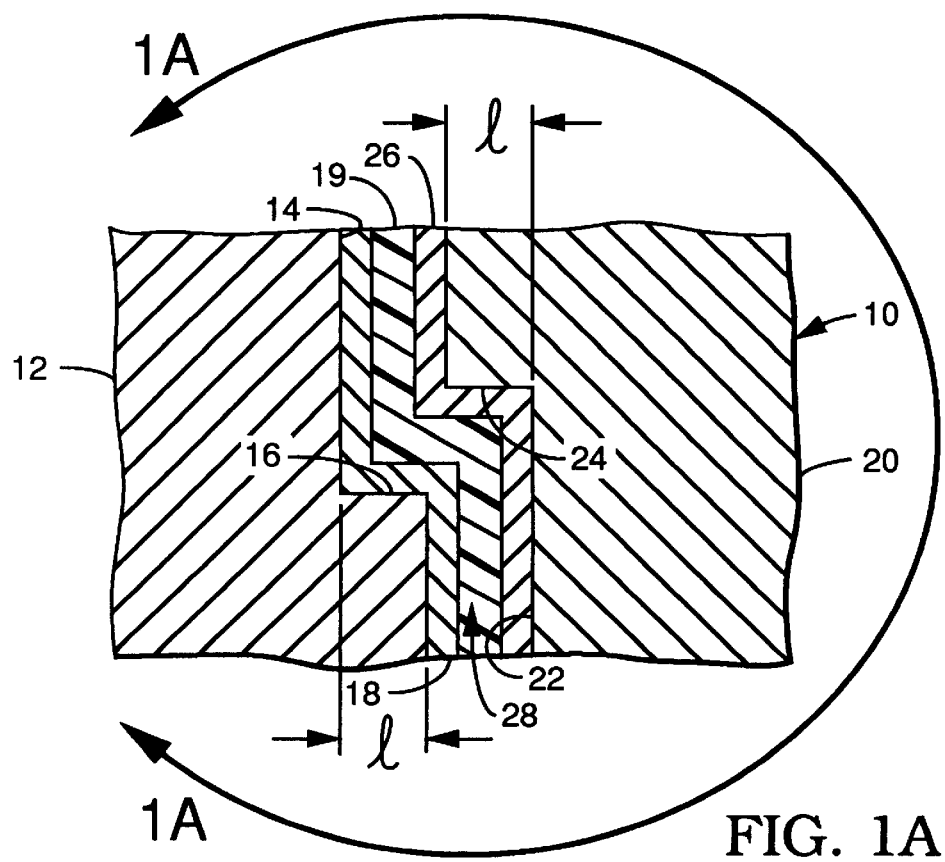
FIG. 1A is an enlarged sectional view of a broken-out portion of the step gap of FIG. 1.

FIGS. 1 and 1A illustrate, essentially in cross-section and broken-out detail, respectively, a step gap head 10 in accordance with the invention. The relative dimensions depicted in the figures are not to scale but are exaggerated to facilitate the description. In an embodiment of the invention, the head 10 includes a first core substrate 12 having a surface 14 in which a step offset 16 is formed. A first high permeability thin film layer 18 (FIG. 1A) is deposited as by sputtering, etc. on the surface 14 and step offset 16. In this embodiment of the invention a second core substrate 20 is formed in a similar manner with a surface 22 and complementary step offset 24 and thin film layer 26. The two substrates may be bonded together in facing relation as depicted in FIG. 1, to define a thin film head with a step gap 28 formed by an insulating gap layer (FIG. 1A) between the confronting magnetic layers 18, 26 on the core substrate surfaces 14, 22 and by the complementary step offsets 16, 24. For simplicity of description herein, only the high permeability thin film magnetic layers 18, 26 forming the head 10 are shown in FIG. 1A. It is well known in the art that other film layers of materials such as insulating, layer deposition preparation, etc., materials are deposited as well in thin film head manufacturing processes. The dimension "l" defines the size of the step and is on the order of from a bit to a few bits in length. In general, it is preferable that the delay corresponding to the dimension "l," that is, the step, be of the order of or larger than the total inter-symbol error, that is, the pulse width of the recording in the medium. Furthermore, although the step offset 16, 24 is depicted herein as perpendicular to the track width, that is, parallel to the direction of the track, it is to be understood that the step offset may be formed at a selected angle of, for example, one through several degrees, relative to the gap length or track direction. The maximum angle should be such that the step offset does not extend over a significant portion of the track width that would cause degradation of the playback signal.

In a preferred embodiment of the invention, the head is formed in the manner usually applied in the manufacture of a thin film head utilizing a single substrate such as, for example, the substrate 12 of FIGS. 1 and 1A with the step offset 16 formed therein by, for example, a machining, etching, etc. process. The high permeability thin film magnetic layer 18 then is selectively deposited on the substrate 12 and step 16. A gap material 19 is deposited on the metal layer 18 to form the step gap 28, and the high permeability thin film magnetic layer 26 is deposited on the gap material 19 to provide the finished step offset head of the invention.

It follows that when a recording is made with a stepped head, a similar step will be formed in the recorded transitions. See, for example, the step 30 in FIG. 1 formed in the recorded transitions 32 in a track 34 recorded magnetically in a magnetic medium 46 (FIG. 4) such as high density disk and/or digital tape mediums, which is moving in a direction shown by arrow 35. When the recording transitions 32 are read back by the same or a similar step head with a step offset, an echo signal will be produced along with the main readout signal whenever the head strays laterally relative to the track. The echo signal will either precede or follow the main readout signal depending upon the transverse direction of the mistracking. The amplitude of the echo signal (as well as of the main readout signal) is a measure of the tracking error.

Figure 2E:
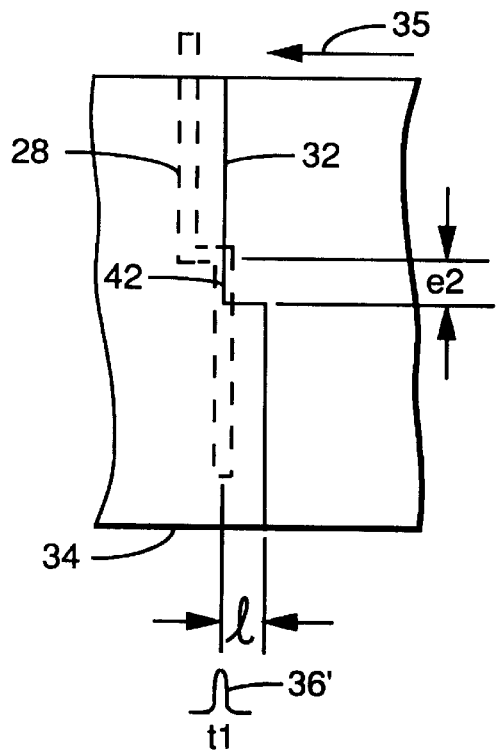
Figure 2F:
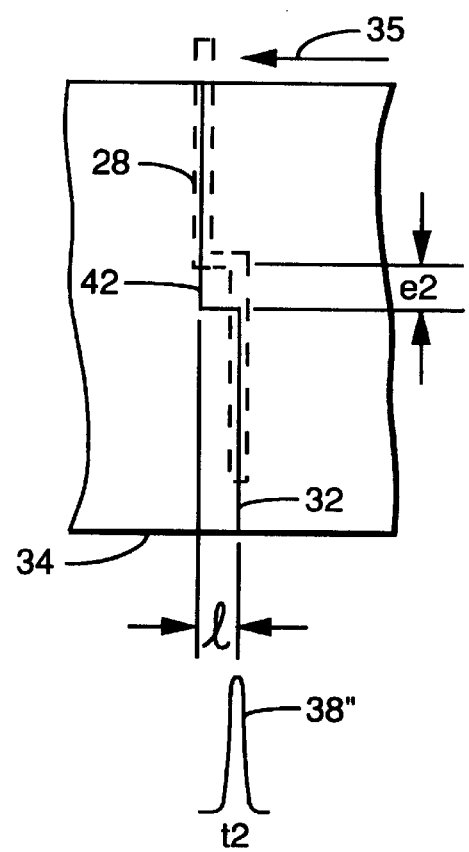
Figure 2G:
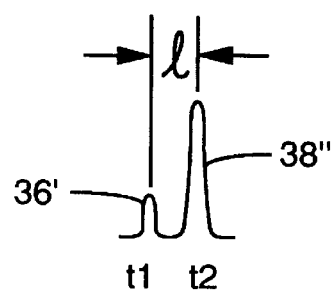

FIGS. 2A–2G depict, by way of example only, a main readout signal 38 and an echo signal 36 which are produced when the step head 10 of the invention is in the read mode and is properly on track, when it is mistracking in a first transverse direction, and when it is mistracking in an opposite, second transverse direction, respectively. To facilitate the description herein, only the gap 28 of the step head 10 of FIG. 1 is illustrated in dashed line in the FIGS. 2A–2G. Thus, FIG. 2A depicts the condition of proper head-to-track tracking with the medium moving in the direction 35. That is, the step head 10 is precisely tracking track 34, and, thus, step gap 28 is precisely in register with the previously recorded transition 32 and the associated step 30. It follows that no echo signal is produced, and a main readout signal 38 of full amplitude is produced during playback of the track.

In FIG. 2B, the step head 10/step gap 28 is depicted mistracking the track 34 and associated recorded transition 32 by a tracking error "e1" in a first transverse direction. Since the track is moving to the left as shown by arrow 35 (alternatively, step head 10 is moving to the right with movement of the medium to the left), the recorded transition 32 is read by the step gap 28 at time "t1." Since a proportionately large portion of the recorded transition 32 is in register with the step gap 28, a main readout signal 38' of less than full amplitude of FIG. 2A, is read at time "t1." Thereafter, as the medium continues to move relative to the head, as depicted in FIG. 2C, at time "t2" a small portion 40 of the recorded transition 32, that is, the portion corresponding to the tracking error "e1," is in register with the corresponding portion of the step gap 28, which produces the echo signal 36. It follows, therefore, that the step gap head 10 produces an output waveform depicted in FIG. 2D which comprises the main readout signal 38' at time "t1" followed by the echo signal 36 at time "t2," wherein the signals are spaced apart a time period corresponding to the size, "l," of the step offset 16, 24 of FIGS. 1 and 1A. As previously mentioned, the step offset dimension "l" preferably is of the order of, or larger than, the total inter-symbol timing.

FIG. 2E depicts the step head 10/step gap 28 mistracking the track 34 and associated recorded transitions 32 by a tracking error, "e2," in a second transverse direction opposite to that of FIGS. 2B–2D. Since the medium and thus the track 34 is moving to the left, a small portion 42 of the recorded transition 32, that is, the portion corresponding to the tracking error, "e2," is first to be in register with a respective portion of the step gap 28, and produces an echo signal 36' at time "t1." Thereafter, at time "t2," FIG. 2F, the proportionately large portion of the recorded transition 32 is in register with the step gap 28 and produces the main readout signal 38", of a smaller magnitude than the main signal 38" of FIG. 2A. It follows that for the opposite transverse mistracking condition, the step gap head 10 produces an output waveform depicted in FIG. 2G, which comprises the echo signal 36' at time "t1" followed by the main readout signal 38" at time "t2," which is in a sequence opposite to the first mistracking condition depicted in FIG. 2D. Thus, the direction of mistracking can readily be detected by suitable circuitry, as is depicted in the FIGS. 3, 4 and 5.

Figures 3A, 3B:
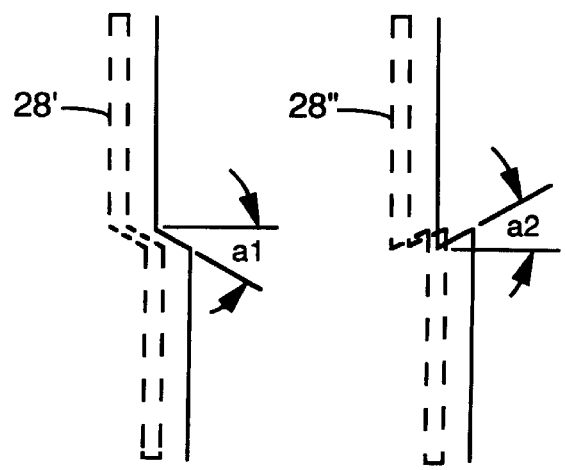
FIGS. 3A and 3B are diagrams illustrating alternative embodiments of the step gap of FIGS. 1 and 2.

FIGS. 3A and 3B illustrate, by way of example only, step gap configurations 28' and 28", respectively, in which the step offset is formed at selected angles "a1" and "a2" relative to the gap length. Although particular angles are shown for purposes of illustration, the angles selected may be from zero degrees, that is, parallel to the direction of the track, through several degrees.

Figure 4:
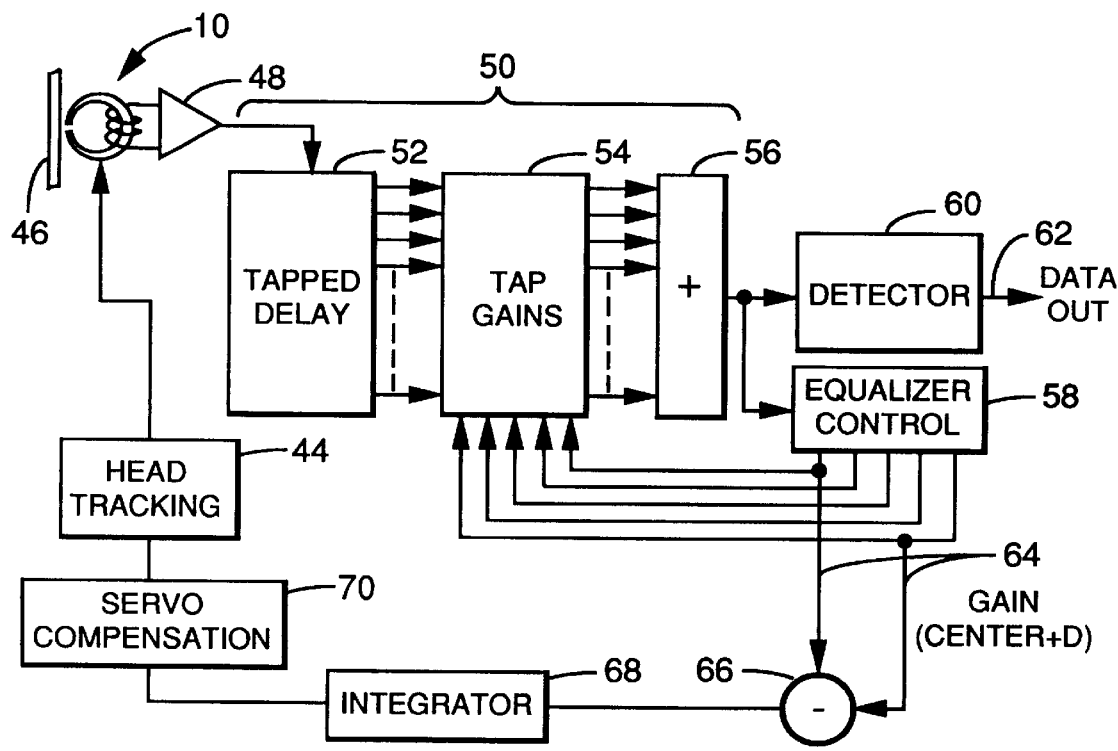
FIG. 4 is a block diagram illustrating an embodiment of the invention.
Figure 5:
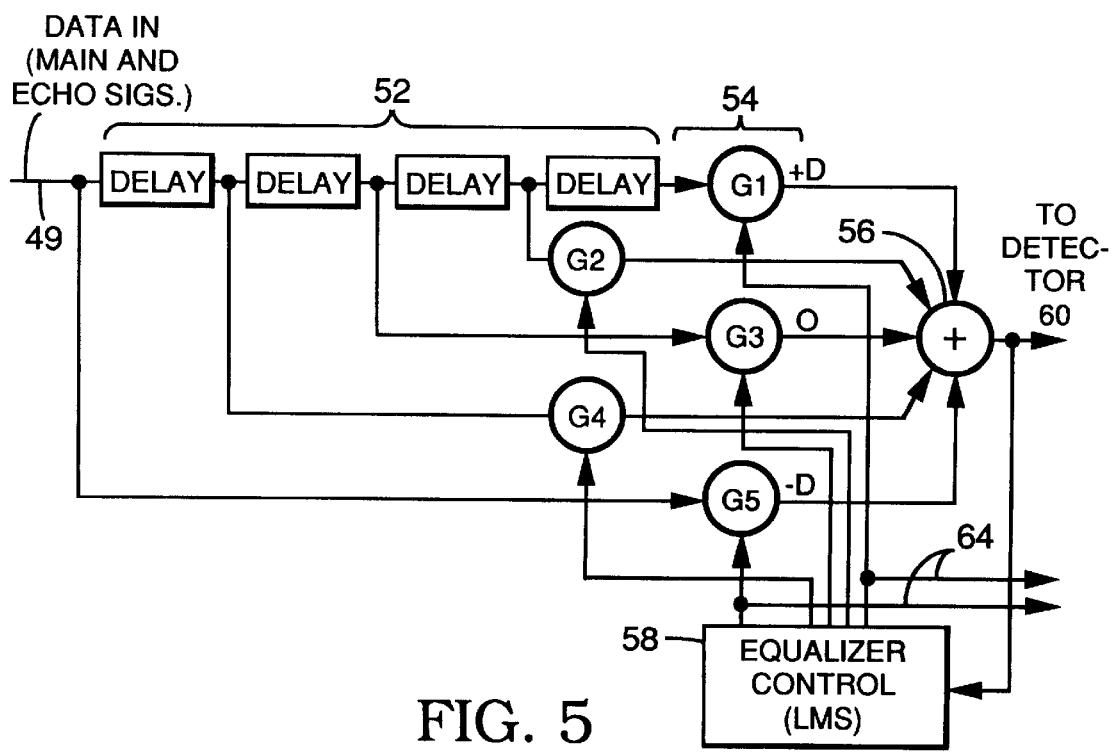
FIG. 5 is a block/schematic diagram illustrating a transversal filter means of the embodiment of FIG. 4.

The magnitude of the tracking error is reflected in the amplitude of the echo signal 36, which also is detected by the circuitry of FIGS. 4 and 5. Since the echo signal causes a corresponding degradation of the main readout signal and, thus, the signal-to-noise ratio, it is highly desirable that any echo signal produced by mistracking conditions be removed from the readout signal.

To this end, FIGS. 4 and 5 illustrate circuitry corresponding to an embodiment of the invention, for detecting the echo signal 36 as well as the main signal 38, and for removing the echo signal while providing head tracking correction via an associated tracking servo system. To this end, the step head 10 of the invention, depicted in the FIGS. 1 and 2, is coupled for transverse tracking movement, relative to tracks in a magnetic disk or digital tape medium, via a head tracking servo/actuator system 44. The signal read from a medium 46 is supplied via an amplifier 48 and a lead 49 to a transversal filter 50 which is illustrated herein as a tapped delay circuit 52, a tap gain circuit 54, and an adder circuit 56. The transversal filter 50 is depicted in more detail in FIG. 5.

The output from the adder circuit 56 comprises an equalized signal in which the specific inter-symbol errors have been controlled, and which is supplied to an equalizer control circuit 58 as well as to a detector circuit 60, such as, for example, a maximum likelihood detector, a sequence detector, etc. The equalizer control means 58 is, in actuality, part of the detector circuit 60. The equalizer control means 58, in response to the equalized signal, supplies tap weights to the tap gain circuit 54 and, particularly, to respective gain circuits (G1, G2, G3, G4 and G5) FIG. 5. The values of the tap weights in effect are selected to subtract out the echo signal which is present, corresponding to any mistracking of the head. The data signal supplied by the detector circuit 60 via an output lead 62 comprises the main data signal read from the medium 46, which is supplied to a conventional data processing circuit (not shown) of the recorder apparatus.

In accordance with the invention, the outputs of two taps whose delays correspond to the echo-to-main signal distance set for the gap offset 16, 24 of the head, are supplied via leads 64 to a subtraction circuit 66. The tap outputs comprise the tap values which are required to cancel the echo signal corresponding to any mistracking, and the difference in the two tap outputs is indicative of the amount of mistracking. The sign, or polarity, of the difference in the two tap outputs is indicative of the direction of the mistracking. A tracking error correction signal corresponding to the degree and direction of the mistracking is supplied by the subtraction circuit 66 to an integrator circuit 68, and, hence, to a servo compensation circuit 70 which supplies an integrated and compensated tracking error signal to the head tracking servo/actuator system 44 of previous mention. The integrator circuit 68 provides low pass integration to cause tracking changes to be made slowly relative to the more rapid tap setting changes. The servo compensation circuit 70 prevents servo circuit oscillation to stabilize the servo/actuator system 44.

Although the invention has been described herein relative to specific embodiments, various additional features and advantages will be apparent from the description and drawings, and, thus, the scope of the invention is defined by the following claims and their equivalents.

What is claimed is:

1. A magnetic head for recording and playing back a signal corresponding to recorded transitions in a magnetic medium, comprising:

a magnetic head surface for containing a transducing gap;

a step formed in the surface to define a step offset in the transducing gap capable of generating a corresponding step offset in the recorded transition in the magnetic medium; and wherein said magnetic head generates an echo signal during the playing back which is indicative of mistracking between the step offset of the head and the step offset in the recorded transition.

2. The magnetic head of claim 1 wherein:

the amplitude and location of said echo signal represents the amount and direction respectively of mistracking.

3. The magnetic head of claim 1 wherein the step is formed in the surface at about the middle of the transducing gap.

4. The magnetic head of claim 1 wherein the step is formed generally parallel to the direction of a track formed of the recorded transitions.

5. The magnetic head of claim 1 wherein the step is formed at a selected angle of from zero to several degrees relative to the direction of the recorded track.

6. The magnetic head of claim 1 wherein a succession of recorded transitions are formed of successive pulses of selected pulse width, wherein:

the step offset provides a delay of the order of or larger than the pulse width.

7. The magnetic head and apparatus of claim 1 wherein:

said magnetic head step offset tracks the step offset in the recorded transition during the process of playing back.

8. The magnetic head of claim 1, including apparatus for playing back the recorded transition, further comprising:

means for detecting any misalignment of the gap step offset relative to the step offset in the recorded transition; and tracking servo means for properly aligning the step offsets in response to the detecting means.

9. The magnetic head and apparatus of claim 8, wherein:

misalignment of the head step offset relative to the step offset in the recorded transition generates an echo signal indicative of the amount and direction of the misalignment; and said detecting means detects the amplitude and polarity of the echo signal to determine the amount and direction respectively of misalignment.

10. The magnetic head and apparatus of claim 9 wherein the detecting means enables the removal of the echo signal from the played back signal during mistracking to prevent associated degradation of the played back signal.

11. Apparatus for maintaining tracking of a magnetic head relative to a track in a magnetic medium, comprising:

a write/read head having a head gap with a step offset for generating a corresponding step offset in a recording in the magnetic medium;

detection means coupled to the head during playback of the recording for detecting an echo signal representative of any lateral mistracking of the step offset of the head gap relative to the step offset in the recording; and servo means responsive to the detection means for minimizing the echo signal to minimize said lateral mistracking.

12. The apparatus of claim 11 wherein:

the head includes a surface containing the step offset of the head gap.

13. The apparatus of claim 12 wherein the track comprises a succession of recorded transitions, and the step offset is of the order of or larger than the minimum inter-transition timing.

14. The apparatus of claim 11 wherein the amplitude of the echo signal is a measure of the degree of tracking error, and the location, preceding or following, of the echo signal relative to a main readout signal corresponding to the recording is an indication of the direction of mistracking.

15. The apparatus of claim 11 wherein the detection means includes:

means coupled to the head for determining the amount and direction of mistracking in response to the echo signal; and detector means responsive to the determining means for supplying to the servo means a correction signal indicative of the amount and direction of tracking error.

16. The apparatus of claim 15 wherein said determining means includes:

a transversal filter having a plurality of taps and a corresponding plurality of tap gains; and means responsive to selected taps and tap gains for providing a signal whose amplitude is indicative of the degree of mistracking and whose polarity is indicative of the direction of mistracking.

17. The apparatus of claim 16 wherein:

said means for providing includes a subtraction circuit for providing a tracking error correction signal whose amplitude is the difference in the selected tap outputs and whose polarity is the sign of the difference.

18. A method of minimizing tracking misalignment of a magnetic head during playback of a recording in a magnetic medium, comprising the steps of:

producing a step offset in the recording in the magnetic medium;

subsequently, during the playback of the recording, detecting any echo signal occurring relative to a main playback signal, wherein the echo signal is indicative of any misalignment;

determining the amplitude of the echo signal and its location, preceding or following, relative to the main playback signal; and correcting any tracking misalignment of the head during the playback by adjusting the lateral position of the head relative to the track to minimize the echo signal.

19. A method of minimizing tracking misalignment of a head during playback of a recording in a magnetic medium, comprising the steps of:

generating a main signal of full amplitude corresponding to the played back recording when the head is properly tracking;

generating an echo signal of amplitude proportional to any mistracking of the recording by the head;

determining whether the echo signal leads or lags the main signal; and correcting any misalignment of the head relative to the recording in response to the steps of generating and determining.

20. The method of claim 19 including the step of:

producing a step offset in the recording in the magnetic medium to enable the generation of the echo signal in the presence of any mistracking.

21. The method of claim 20 wherein the step of producing includes:

forming a step in substantially the middle of a gap of the head, wherein the step is generally parallel to, or within several degrees angle with, the length of the gap.

22. The method of claim 19 wherein the steps of generating and determining include:

generating a pair of signals from selected taps in a transversal filter;

determining the difference in the pair of signals to obtain the degree of mistracking; and determining the polarity of the difference in the pair of signals to obtain the direction of mistracking.

* * * * *